UNITED STATES PATENT OFFICE.

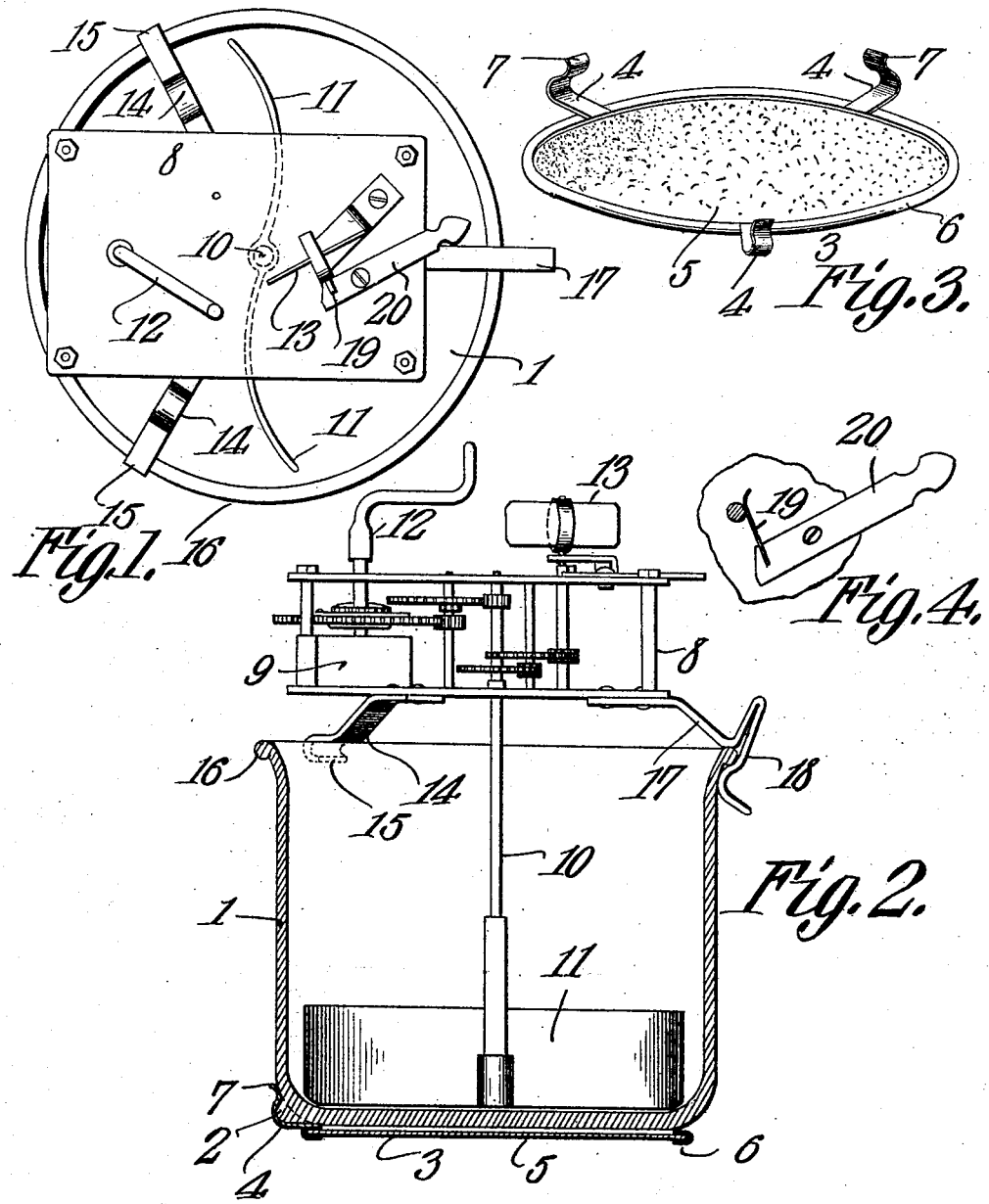

MARY E. RICKMAN, OF LEBO, KANSAS, ASSIGNOR OF ONE-HALF TO ELIZABETH SPONSELLER, OF EMPORIA, KANSAS.

STIRRING APPARATUS FOR KETTLES.

No. 915,310.  Specification of Letters Patent.  Patented March 16, 1909.

Application filed December 31, 1907. Serial No. 408,744.

To all whom it may concern:

Be it known that I, MARY E. RICKMAN, a citizen of the United States, residing at Lebo, in the county of Coffey and State of Kansas, have invented a new and useful Stirring Apparatus for Kettles, of which the following is a specification.

This invention relates to an improved kettle such as are used for preserving and cooking fruit and other materials; and has for its object to provide a mechanism, which may be quickly attached to and removed from a cooking utensil, operated by spring power for stirring constantly or intermittently the contents of said vessel while cooking to keep the substance therein thoroughly mixed, and to prevent burning. As a further protection against burning, the vessel is provided with an auxiliary bottom removably secured to the vessel by spring arms resembling in measure the arms for securing the power mechanism to the top of the utensil, but lighter.

With these objects in view the invention comprises the combination and arrangement of parts hereinafter described and claimed, reference being had to the accompanying drawing, in which—

Figure 1 is a top plan view of the invention; Fig. 2 is a vertical section of the kettle and auxiliary bottom, the stirring mechanism being shown in elevation; Fig. 3 is a perspective view of the auxiliary bottom, detached; and Fig. 4 is a detail view.

Similar reference numerals are used for the same parts in all the figures.

The numeral 1 indicates a kettle which in general formation and construction may be made like similar utensils now in use. At the bottom of the kettle are or may be formed a plurality of lugs 2, or an encircling flange if preferred, to which the auxiliary bottom 3 is removably attached by means of springs 4 riveted or otherwise fastened to the edge of the detachable bottom 3. The auxiliary bottom 3 is preferably made of asbestos 5 in a thin sheet of circular form and protected at its edge by a binding 6 of metal folded on each side as shown. The springs 4, here represented as three in number, are equally spaced and riveted to the binding 6, they are radially disposed in general direction and bent upwardly so as to engage over the lugs 2, there is also an outward turn 7 at the end so that the finger will be able to readily disconnect the auxiliary bottom when desired.

8 indicates a motor driven by a spring 9 which operates through gearing, a shaft 10 depending from the bottom of the motor into the kettle 1, and carrying on its lower end a stirrer 11 consisting, in this instance, of two broad curved arms extending from opposite sides of the shaft 10 nearly to the sides of the vessel and just clearing the bottom thereof. On top of the motor frame is the winding key 12 and governor 13. Riveted to the under side of the motor frame are a plurality of arms 14 which extend to the edge of the kettle and there bent over to form hooks 15 for interlocking with the top bead 16 of the kettle. In the drawing three arms are shown as supporting the motor, one of them 17, instead of turning downwardly beneath the bead 16 is bent upwardly and has a spring latch 18 on its end which latch engages under the aforesaid bead and enables the motor to be easily and quickly attached and removed from the kettle.

The speed of the motor is regulated by a spring finger 19, see Fig. 4, fixed to a lever 20 which when operated carries said spring against the shaft of the governor 13 and, by its friction thereon, changes its speed of rotation or stops its movement entirely.

The operation of the device is obvious and further description thereof is deemed unnecessary.

Having thus described my invention, what is claimed is:—

A motor for a preserving or cooking kettle having spring arms adapted to be detachably fastened to the upper edge of said utensil, one of said spring arms being formed into a finger piece for readily removing said motor from the kettle, a shaft driven by said motor and having diametrically disposed stirring blades at the bottom of the kettle, a regulator for normally limiting the speed of said motor, a lever pivoted to the motor frame, and a spring finger adapted to be brought into contact with the shaft of said regulator with increasing force or to be removed entirely therefrom by movements of said lever.

In testimony that I claim the foregoing as my own, I have hereto affixed my signature in the presence of two witnesses.

MARY E. RICKMAN.

Witnesses:
Mrs. J. E. RICKMAN,
GEO. W. SIFFIN.